(12) United States Patent
Anderson et al.

(10) Patent No.: US 10,257,989 B2
(45) Date of Patent: Apr. 16, 2019

(54) STABILIZER FOR CENTER PIVOT IRRIGATION SYSTEM

(71) Applicant: Pivot Pro, L.L.C., Sikeston, MO (US)

(72) Inventors: Jeremiah Scott Anderson, Sikeston, MO (US); Justin Daniel Bradley, Oran, MO (US); Terance Paul Kellett, Sikeston, MO (US)

(73) Assignee: Pivot Pro, L.L.C., Sikeston, MO (US)

( * ) Notice: Subject to any disclaimer, the term of this patent is extended or adjusted under 35 U.S.C. 154(b) by 12 days.

(21) Appl. No.: 15/657,994

(22) Filed: Jul. 24, 2017

(65) Prior Publication Data

US 2019/0021244 A1    Jan. 24, 2019

(51) Int. Cl.
*A01G 25/09* (2006.01)
*B05B 1/20* (2006.01)

(52) U.S. Cl.
CPC .......... *A01G 25/092* (2013.01); *A01G 25/09* (2013.01); *B05B 1/20* (2013.01)

(58) Field of Classification Search
CPC ......... A01G 25/09; A01G 25/092; B05B 1/20
USPC ........ 239/728, 753, 722, 723, 726, 280–281
See application file for complete search history.

(56) References Cited

U.S. PATENT DOCUMENTS

| | | | | |
|---|---|---|---|---|
| 3,237,867 A | * | 3/1966 | Hogg | A01G 25/09 138/106 |
| 3,381,893 A | * | 5/1968 | Smith, Jr. | A01G 25/09 239/1 |
| 3,533,556 A | * | 10/1970 | Dowd | A01G 25/092 239/728 |
| 3,684,180 A | * | 8/1972 | Gorzell | A01G 25/09 239/733 |
| 3,749,117 A | * | 7/1973 | Garwood | A01G 25/092 239/728 |
| 3,866,835 A | * | 2/1975 | Dowd | A01G 25/092 180/187 |
| 3,917,171 A | * | 11/1975 | Reinke | A01G 25/092 180/186 |
| 3,957,204 A | * | 5/1976 | Farris | A01G 25/092 239/731 |
| 4,209,068 A | * | 6/1980 | Corsentino | A01B 37/00 172/572 |
| 4,358,055 A | * | 11/1982 | Reinke | A01G 25/09 239/733 |

(Continued)

*Primary Examiner* — Steven J Ganey
*Assistant Examiner* — Joseph A Greenlund
(74) *Attorney, Agent, or Firm* — Sandberg Phoenix & von Gontard, P.C.

(57) ABSTRACT

A stabilizer is used on a tower structure of a center pivot irrigation system. The tower structure has wheels supporting the tower on a ground surface and the wheels are adapted and configured to roll on the ground surface in a direction of travel. The stabilizer has a bracing member with proximal and distal ends spaced apart by a length. The bracing member proximal end is adapted and configured to be operatively releasably connected to the tower structure such that when the stabilizer is mounted to the tower structure, the bracing member is movable from a stored position in which the bracing member distal end is arranged generally adjacent to the tower structure to a deployed position in which the bracing member distal end is arranged outboard of the wheels in the direction of travel and in contact with the ground surface.

18 Claims, 6 Drawing Sheets

(56) References Cited

U.S. PATENT DOCUMENTS

| | | | | |
|---|---|---|---|---|
| 4,442,974 | A * | 4/1984 | Noble | A01G 25/097 137/614.02 |
| 4,501,392 | A * | 2/1985 | Hait | A01G 25/092 239/728 |
| 4,877,189 | A * | 10/1989 | Williams | A01G 25/097 239/749 |
| 5,685,497 | A * | 11/1997 | Cole | A01G 25/092 239/728 |
| 6,431,475 | B1 * | 8/2002 | Williams | A01G 25/09 239/740 |
| 7,802,738 | B2 * | 9/2010 | Sinden | A01G 25/097 239/722 |
| 8,998,162 | B1 * | 4/2015 | Gutha | A01G 25/09 239/735 |
| 9,131,832 | B2 * | 9/2015 | Fouts | A61B 1/018 |
| 9,301,459 | B1 * | 4/2016 | Williams | A01G 25/092 |
| 10,064,349 | B1 * | 9/2018 | Bainter | A01G 25/092 |
| 2003/0029943 | A1 * | 2/2003 | Malsam | A01G 25/092 239/722 |
| 2010/0176225 | A1 * | 7/2010 | Vorderstrasse | A01G 25/092 239/738 |
| 2016/0157445 | A1 * | 6/2016 | Mortensen | A01G 25/092 239/728 |
| 2017/0000047 | A1 * | 1/2017 | Binder | A01G 25/092 |

* cited by examiner

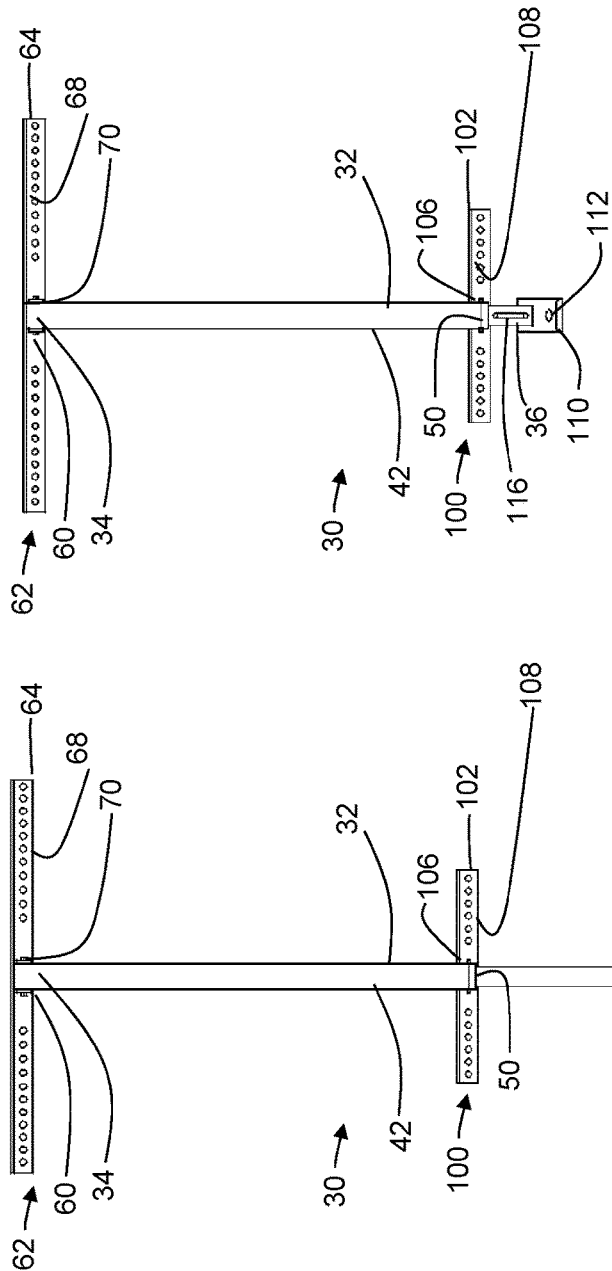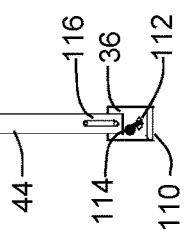

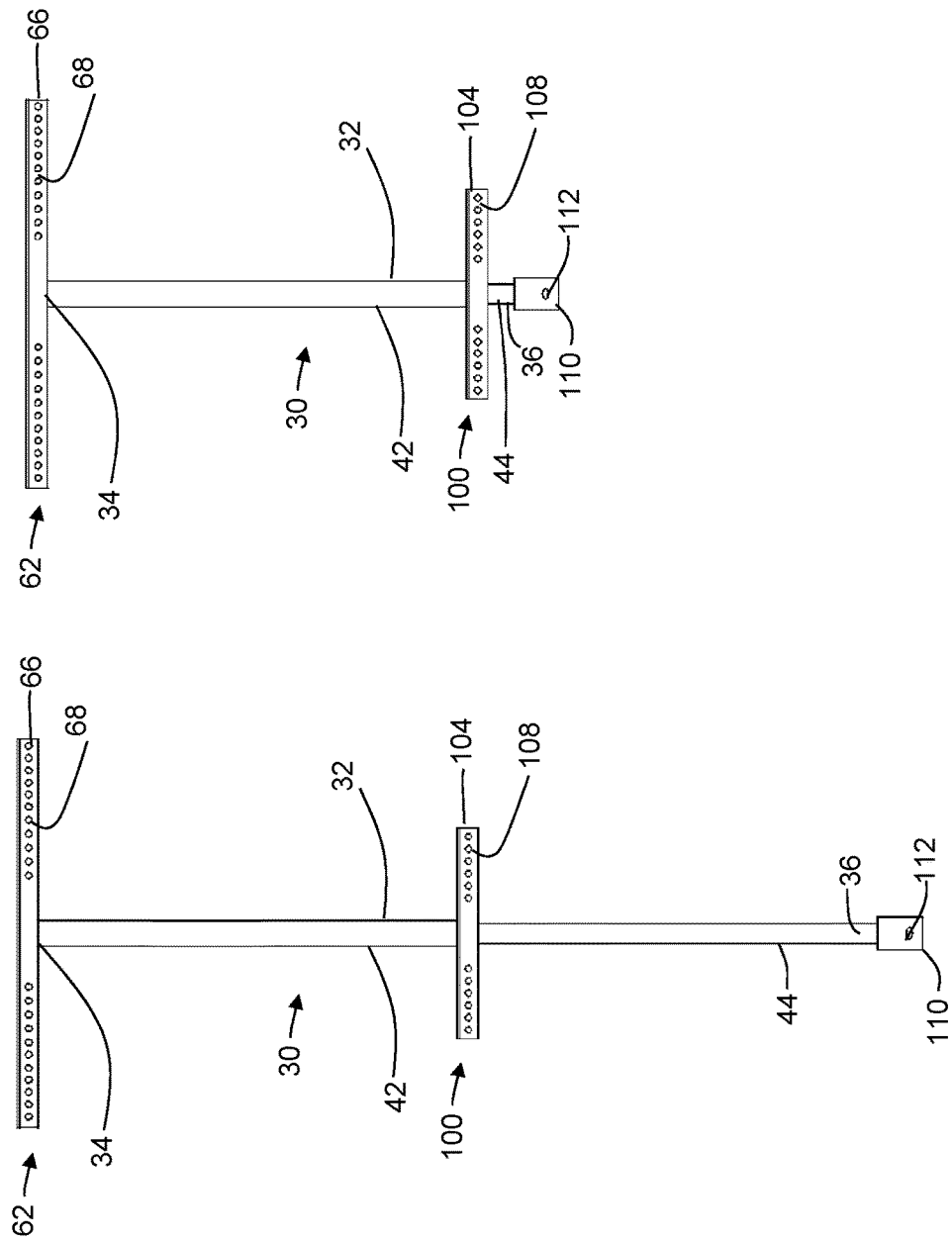

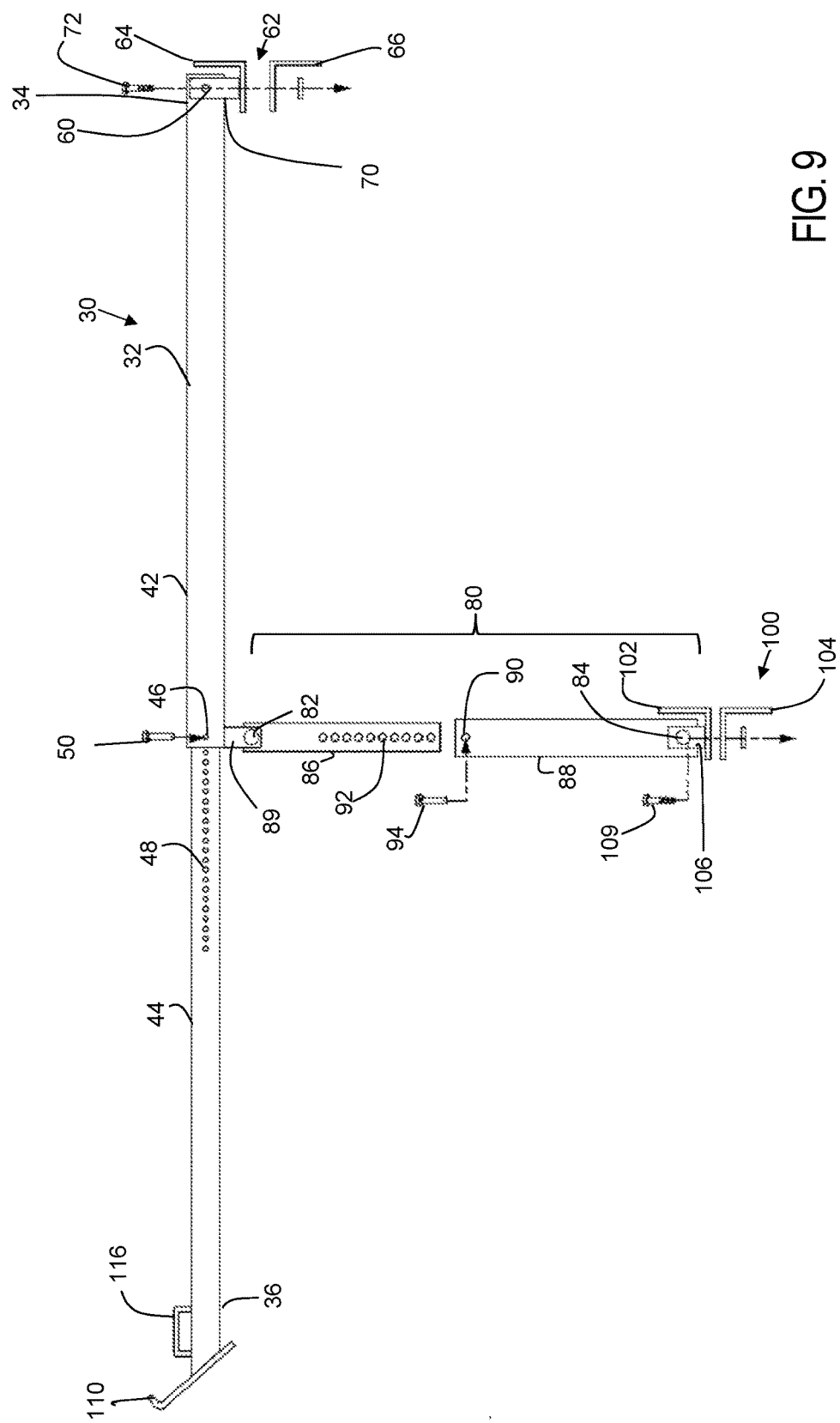

STABILIZER FOR CENTER PIVOT IRRIGATION SYSTEM

BACKGROUND AND SUMMARY

The present disclosure relates to a stabilizer for an irrigation system typically used in an agricultural setting. More in particular, the disclosure relates to a stabilizer for a center pivot irrigation system. The stabilizer may be provided as original equipment on a center pivot irrigation system. In the alternative, the stabilizer may be retrofitted onto an existing center pivot irrigation system.

DESCRIPTION OF DRAWINGS

FIG. 5 is a front view of the bracing member of the stabilizer in a deployed position.

FIG. 6 is a front view of the bracing member of the stabilizer in a stored position.

FIG. 7 is a rear view of the bracing member of the stabilizer in a deployed position.

FIG. 8 is a rear view of the bracing member of the stabilizer in a stored position.

FIG. 9 is a side exploded view of the stabilizer.

DETAILED DESCRIPTION

Figure 1:
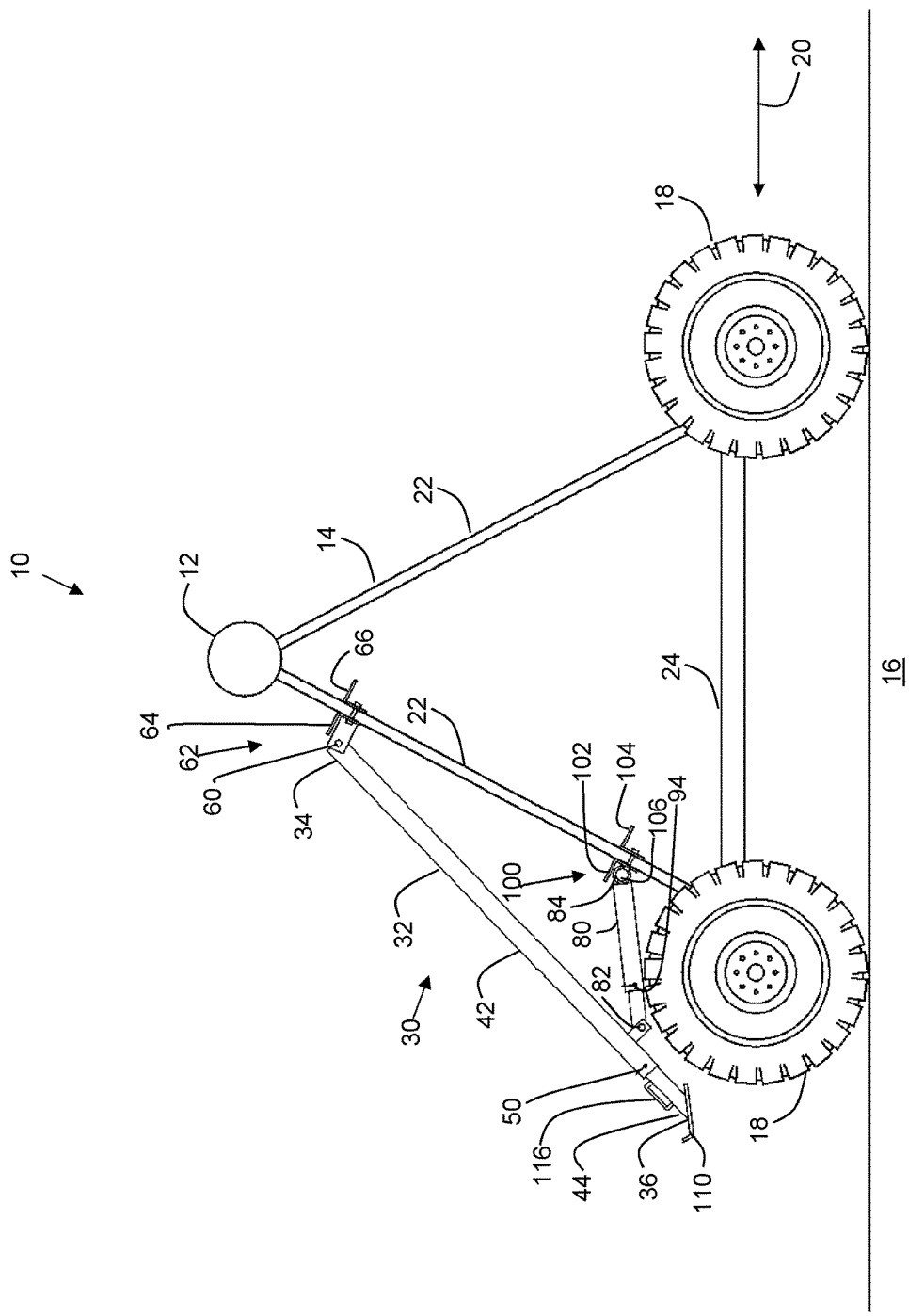
FIG. 1 is a side view of a typical center pivot irrigation system tower with an exemplary stabilizer mounted on the tower of the center pivot irrigation system with a bracing number of the stabilizer in a stored position.
Figure 2:
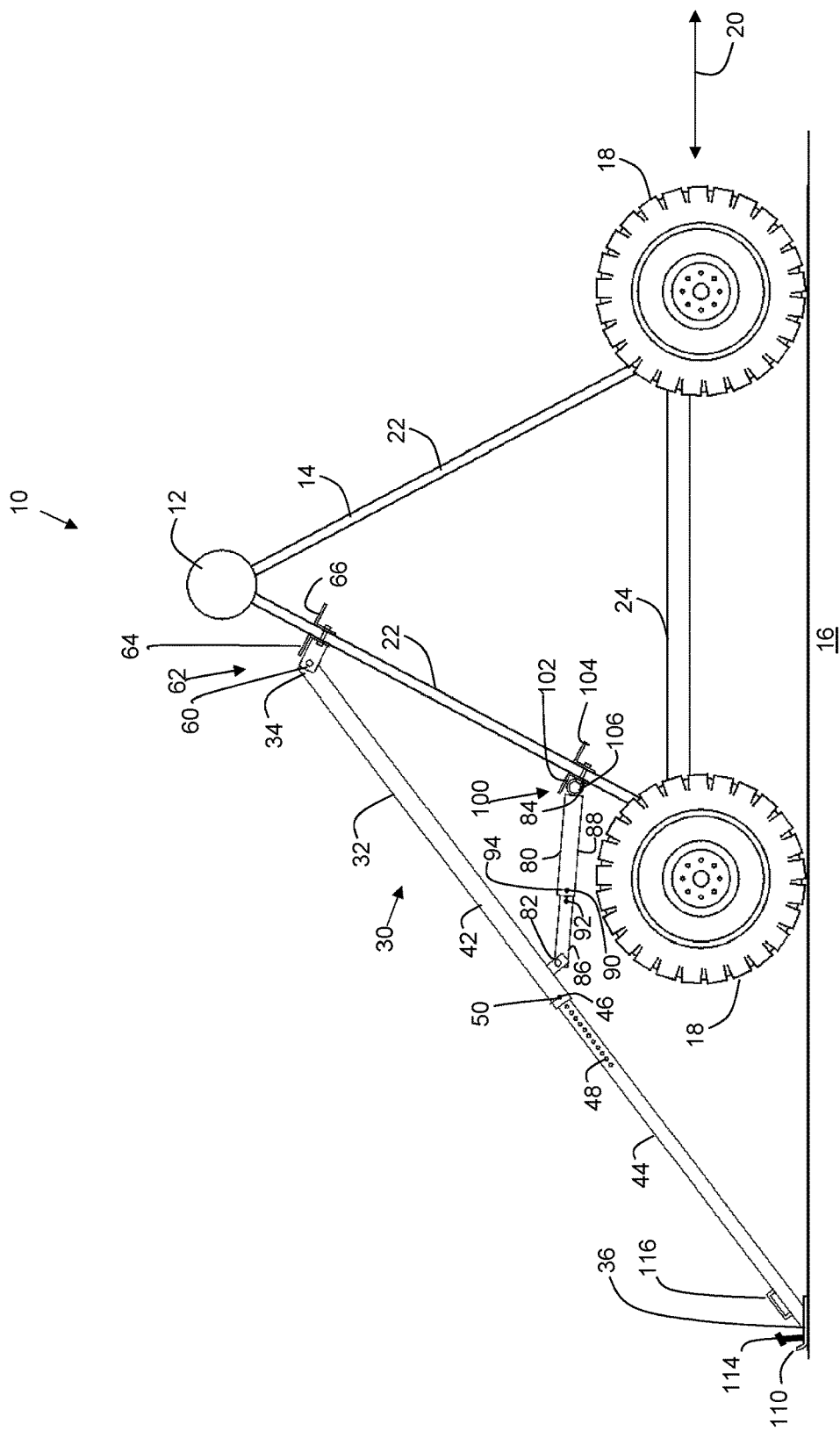
FIG. 2 is a side view of the typical center pivot irrigation system tower with the bracing member of the stabilizer in a deployed position.
Figure 4:
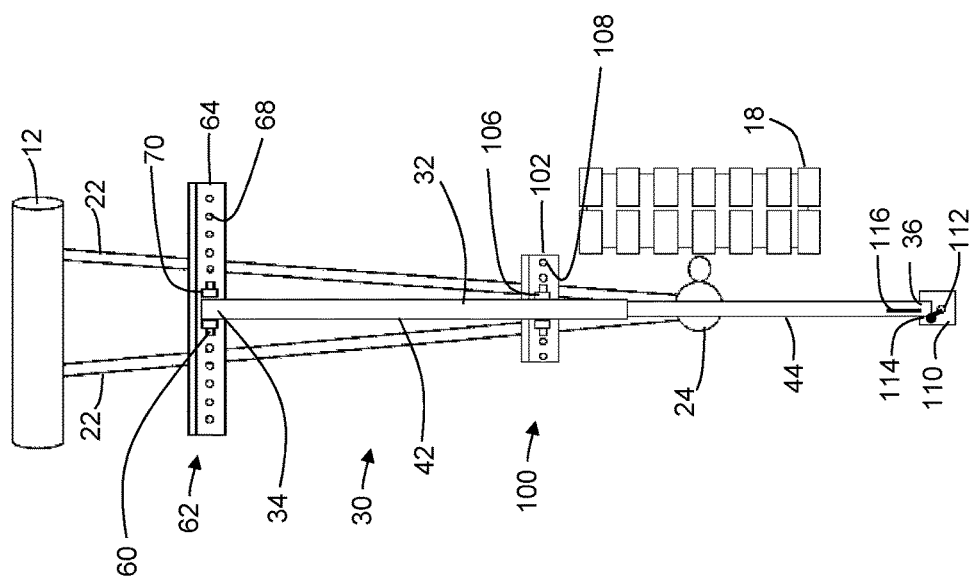
FIG. 4 is a tower of FIG. 3 with the bracing member of the stabilizer installed on the tower structure and in a deployed position.
Figure 3:
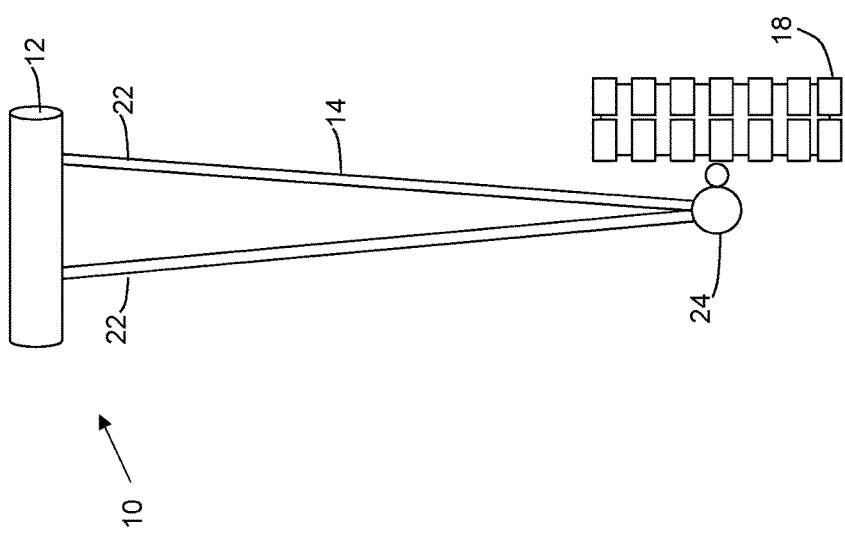
FIG. 3 is a front view of a typical center pivot irrigation system tower without a stabilizer installed showing a V-shaped arrangement of upstanding members forming the structure of the tower.

A center pivot irrigation system 10 is typically used in an agricultural setting and includes an irrigation pipe 12 that is supported by a tower 14. The tower 14 in turn is supported above a ground surface 16 with wheels 18. There are typically 5 to 7 towers in a center pivot irrigation system. Each tower 14 is positioned radially outward from a central well and connected with an irrigation pipe and other structure to allow each tower to travel in an orbiting path about the central well. Water is pumped from the central well through the irrigation pipe where it is sprayed to irrigate the fields. The wheels 18 are driven by a transmission (not shown) on each tower 14 which enables each tower to orbit around the central well during operation. The rotation of the wheels 18 define a direction of travel 20 as the tower and the irrigation pipe 12 supported by the tower orbit around the central well. The tower 14 may include a structure with one or more generally upstanding members 22 that extend from a transverse beam 24. There may be two upstanding members that together form a V-shape extending upward from the transverse beam 24, or there may be one upstanding member extending upward from the transverse beam 24. The wheels 18 may be spaced apart from one another on laterally opposite ends of the transverse beam 24 (left and right in FIGS. 1 and 2). The transverse beam 24 and tower structure may include the transmission to drive the wheels 18 in the direction of travel 20 during operation of the irrigation system. The irrigation pipe 12 is typically above the upstanding members 22 in a position above the ground surface 16 to maximize the spraying of irrigation water onto the fields.

To stabilize the tower 14 of the center pivot irrigation system when the system is offline and not in use, a stabilizer 30 may be provided. For instance, in the spring, fall and winter seasons, the center pivot 10 may be positioned in the field and winterized for the season. To limit damage to the center pivot 10 during severe weather that may occur during the spring, fall, and winter idle seasons, the stabilizer 30 may be deployed to stabilize a tower of the center pivot.

As will be described in greater detail below, one or more towers 14 of the center pivot irrigation system 10 may include the stabilizer 30. The stabilizer 30 may be provided on one or both lateral sides of the tower. The stabilizer 30 may include a bracing member 32 with opposite proximal and distal ends 34,36 spaced apart by a length. The bracing member proximal end 34 may be operatively connected to an upstanding member 22 of the structure of the tower 14. The bracing member 32 may be movable from a stored position (FIG. 1) in which the bracing member distal end 36 is arranged generally adjacent to the tower 14 and a deployed position in which the bracing member distal end is arranged generally outboard of the wheels 18 the direction of travel 20 and in contact with the ground surface 16.

The bracing member 32 may have a variable length. For instance, as shown in the drawings, the bracing member 32 may have first and second portions 42,44 which are telescopically arranged to provide a variable length bracing member 32. The bracing member first and second portions 42,44 may also be slidingly connected to each other in an axial offset manner. For instance, the bracing member first portion may include guide channels on its outer wall in which the second portion slides in providing a variable length of the bracing member. As shown in the drawings, the bracing member second portion 44 includes the distal end 36 and the bracing member first portion 42 includes the proximal end 34. The overall length of the bracing member 32 may be adjustable to accommodate the angle and height of the tower structure and the slope of the ground surface so as to allow the bracing member to extend laterally outboard of the wheels 18 and engage the ground surface 16 to stabilize the tower of the center pivot irrigation system. In one example, for instance, as shown in the drawing, the bracing member first portion 42 may have a locking hole 46 and the second portion 44 may be provided with a plurality of positioning holes 48 extending along a portion of the length of the second portion. The locking hole 46 of the bracing member first portion 42 may be placed in register with any of the plurality of the positioning holes 48 of the bracing member second portion 44. A fastener 50 such as a cotter pin or hitch pin may be directed through the bracing member first portion lock hole 46 and a selected bracing member second portion positioning hole 48 to set the variable length of the bracing member 32.

As shown in the drawings, the proximal end 34 of the bracing member 32 may be operatively pivotally connected to an upper portion of the tower structure of the center pivot irrigation system. The proximal end 34 of the bracing member 32 includes a pivot connection 60 to a top support mount 62. The top support mount 62 may comprise first and second top support members 64,66. The top support member 64 may comprise an L-shaped angle iron with a plurality of mounting holes 68. The first top support member 64 may include a yoke 70 which receives the proximal end 34 of the bracing member 32 with the pivot pin or fastener 60 enabling the bracing member to pivot relative to the first top support member. The second top support member 66 may cooperate with the first top support member 64 to releasably secure the stabilizer to the tower structure of the center pivot system. For instance, the tower structure two upstanding members 22 extending vertically upward in a V-shape from the transverse beam 24 to the irrigation pipe 12 provide a wedge shape against which fasteners 72 connecting the first and second top support members 64,66 may engage to maintain a vertical position of the top support mount 62 on the upstanding members. The fasteners 72 directed through the mounting holes 68 of the first and second top support members 64,66 may cooperate with the V-shape of the upstanding members 22 of the tower structure 14 to lock the top support mount 62 in a required vertical position on the tower structure. The fasteners 72 directed to the mounting holes 68 may directly engage the edges of and wedge against the V-shaped upstanding members 22 of the tower structure 14 and support the top support mount 62 in position on the tower structure while the first and second top support members 64,66 apply pressure against the faces of the V-shaped upstanding members of the tower structure. While the drawings show a top support mount configured to be releasably connected to the tower structure, for instance, in a retrofit application, the tower structure may have a top support mount integrally formed with the tower structure, for instance, in an original equipment application. While the drawings show the bracing member moving laterally outward from the tower structure with the bracing member proximal end operatively pivotally connected to the tower structure, the bracing member may extend laterally outward from the transverse beam of the tower structure, pivot outward from the transverse beam, or pivot outward and downward from the irrigation pipe or another adjacent structure.

The stabilizer 30 may also include a support strut 80 extending between the bracing member 32 and the tower structure 14. The support strut 80 may have a pivoting connection 82 with the bracing member and a pivot connection 84 with a bottom support mount 100 that operatively connects the support strut to the tower structure to accommodate the travel and angle of the bracing member as it moves between the stored and deployed positions. The support strut 80 may also have an adjustable length to accommodate the travel and angle of the bracing member as it moves between the stored and deployed positions. For instance, as shown in the drawings, the support strut may have first and second portions 86,88 each having the pivot connection 82,84 with the bracing member 32 and bottom support mount 100, respectively. A yoke assembly 89 may be provided on the underside of the bracing member 32 to provide a pivot point for the pivot connection of the support strut first portion 86. The support strut first and second portions 86,88 may be telescopically arranged to provide a variable length for the support strut. The support strut first and second portions 86,88 may also be slidingly connected to each other in an axial offset manner. For instance, the support strut first portion may include guide channels on its outer wall in which the second portion slides in providing a variable length of the support strut. The support strut second portion 88 may have a locking hole 90 and the support strut first portion 86 may be provided with a plurality of positioning holes 92 extending along a portion of the length of the second portion. The locking hole 90 of the support strut second portion 88 may be placed in register with any of the plurality of the positioning holes 92 of the support strut first portion 86. A fastener 94 such as a cotter pin or a hitch pin may be directed through the support strut first portion lock hole 90 and a selected support strut first portion positioning hole 92 to set the variable length of the support strut 80.

The bottom support mount 100 may have first and second bottom support members 102,104 configured to releasably connect the support strut to the tower structure. The support strut 80 may be operatively and pivotally connected to the tower structure 14 through a yoke assembly 106 provided on the first bottom support member 102. Each bottom support member 102,104 may comprise an L-shaped angle iron with a plurality of mounting holes 108. As mentioned before, the tower structure 14 may include two upstanding members 22 extending vertically upward in a V-shape from the transverse beam 24 to the irrigation pipe 12. Fasteners 109 directed through the mounting holes 108 of the first and second bottom support members 102,104 may cooperate with the V-shape of the upstanding members of the tower structure to lock the bottom support mount 100 in a required vertical position on the tower structure 14. For instance, the fasteners 109 directed to the mounting holes 108 may directly engage the edges of and wedge against the V-shaped upstanding members 22 of the tower structure 14 and support the bottom support mount 100 in position on the tower structure while the first and second bottom support members 102,104 apply pressure against the faces of the V-shaped upstanding members of the tower structure. While the drawings show a bottom support mount configured to be releasably connected to the tower structure, for instance, in a retrofit application, the tower structure may have a bottom support mount integrally formed with the tower structure, for instance, in an original equipment application.

The distal end of the bracing member 36 may be provided with a foot 110 to facilitate the engagement of the bracing member with the ground surface. The foot 110 may include a hole 112 to accommodate a ground stake 114 (FIG. 2) to further secure the bracing member 32 to the ground surface 16. The distal end 36 of the bracing member 32 may also include a handle 116 to enable the user to more efficiently move the bracing member between the stored position and the deployed position.

While the drawings show what one stabilizer on one side of the center pivot irrigation system and tower structure, a like stabilizer may be provided on the opposite side of the tower. The stabilizer may be provided on one or more towers of the center pivot irrigation system as needed.

As various modifications could be made in the constructions and methods herein described and illustrated without departing from the scope of the invention, it is intended that all matter contained in the foregoing description are shown in the accompanying drawings shall be interpreted as illustrative and not as limiting. The breadth and scope of the present invention should not be limited by any of the above-described exemplary embodiments.

What is claimed is:

1. A center pivot irrigation system comprising:
   a tower having a structure and wheels supporting the tower on a ground surface, the wheels being adapted and configured to roll on the ground surface in a direction of travel;
   a stabilizer having a bracing member with proximal and distal ends spaced apart by a length; the bracing member proximal end being operatively pivotally connected to the tower structure; the bracing member being movable from a stored position in which the bracing member distal end is arranged generally adjacent to the tower structure to a deployed position in which the bracing member distal end is arranged outboard of the wheels in the direction of travel and in contact with the ground surface; the bracing member comprising a first portion defining a first portion axis and a second portion defining a second portion axis; said first and second portion axes being generally parallel to each other; said first and second portions being operatively connected such that said second portion is movable axially relative to said first portion to linearly adjust an overall length of said bracing member such that said bracing member linearly moveable between said stored and deployed positions; and an extendable/retractable support strut extending between the tower structure and the bracing member.

2. The center pivot of claim 1 wherein the bracing member first and second portions are telescopically arranged.

3. The center pivot of claim 1 wherein said support strut is pivotally connected at a first end to the tower structure and pivotably connected at a second end to the bracing member between the proximal and distal ends of the bracing member; said support strut having an adjustable length and being adjustable between an extended position of a first length and retracted position of a second shorter length whereby, said support strut increases in length as said bracing member is extended to its deployed position and decreases in length as said bracing member is returned to said stored position.

4. The center pivot of claim 1 wherein the support strut comprises first and second portions telescopically arranged.

5. The center pivot of claim 1 further comprising a handle at the bracing member distal end.

6. The center pivot of claim 1 wherein said stabilizer is a first stabilizer; said center pivot further comprising a second stabilizer mounted to the tower structure.

7. The center pivot of claim 6 wherein the second stabilizer comprises:

a bracing member with proximal and distal ends spaced apart by a length; the bracing member proximal end being operatively pivotally connected to the tower structure; the bracing member being movable from a stored position in which the bracing member distal end is arranged generally adjacent to the tower structure to a deployed position in which the bracing member distal end is arranged outboard of the wheels in the direction of travel and in contact with the ground surface; the bracing member comprising a first portion defining a first portion axis and a second portion defining a second portion axis; said first and second portion axes being generally parallel to each other; said first and second portions being operatively connected such that said second portion is movable axially relative to said first portion to axially adjust said length of said bracing member such that said bracing member linearly moveable between said stored and deployed positions.

8. The center pivot of claim 7, wherein said second stabilizer further comprises a support strut extending between the tower structure and the bracing member between the proximal and distal ends; said support strut being pivotally connected at a first end to the tower structure and pivotally connected at a second end to the bracing member between the proximal and distal ends of the bracing member; said support strut having an adjustable length and being adjustable between an extended position of a first length and retracted position of a second shorter length whereby, said support strut increases in length as said bracing member is extended to its deployed position and decreases in length as said bracing member is returned to said stored position.

9. The center pivot of claim 6 wherein the second stabilizer is on a different side of said tower from said first stabilizer.

10. The center pivot of claim 6 wherein the second stabilizer is on an opposite side of said tower from said first stabilizer.

11. A stabilizer adapted and configured for mounting on a tower structure of a center pivot irrigation system, wherein the tower structure has a ground engaging portion; the stabilizer comprising:

a bracing member with proximal and distal ends spaced apart by a length; the bracing member comprising a foot at the distal end; the bracing member proximal end being adapted and configured to be operatively pivotally connected to the tower structure, such that when the stabilizer is mounted to the tower structure, the bracing member is movable from a stored position in which the bracing member distal end is arranged generally adjacent to the tower structure to a deployed position in which the bracing member distal end is arranged outboard ground engaging portion of the tower and in contact with the ground surface; the bracing member comprising a first portion defining a first portion axis and a second portion defining a second portion axis; said first and second portion axes being generally parallel to each other; said first and second portions being operatively connected such that said second portion is movable axially relative to said first portion to axially adjust an overall length of said bracing member such that said bracing member linearly moveable between said stored and deployed positions.

12. The stabilizer of claim 11 wherein the bracing member first and second portions are telescopically arranged.

13. The stabilizer of claim 11 further comprising a support strut extending between the tower structure and the bracing member when said stabilizer is mounted to a tower structure; said support strut being pivotally connectable at a first end to the tower structure and pivotally connected at a second end to the bracing member between the proximal and distal ends of the bracing member; said support strut having an adjustable length and being adjustable between an extended position of a first length and retracted position of a second shorter length whereby, said support strut increases in length as said bracing member is extended to its deployed position and decreases in length as said bracing member is returned to said stored position.

14. The stabilizer of claim 11 wherein the support strut comprises first and second portions telescopically arranged.

15. The stabilizer of claim 11 further comprising a handle at the bracing member distal end.

16. The center pivot of claim 11 further comprising a ground stake adapted to pass through the foot to a portion into ground.

17. The stabilizer of claim 11 further comprising a foot at the distal end of the brace member.

18. The stabilizer of claim 17 further comprising a ground stake adapted to pass through the foot to a portion into ground.

* * * * *